(12) United States Patent
Hu et al.

(10) Patent No.: US 11,980,119 B2
(45) Date of Patent: May 14, 2024

(54) METHOD FOR CONVEYING AND DROPPING SEEDLINGS BASED ON DEVICE FOR CONVEYING AND POSITIONING SEEDLING TRAY OF AUTOMATIC TRANSPLANTER

(71) Applicant: JIANGSU UNIVERSITY, Zhenjiang (CN)

(72) Inventors: Jianping Hu, Zhenjiang (CN); Mengjiao Yao, Zhenjiang (CN); Shulin Liu, Zhenjiang (CN); Jinhao Zhou, Zhenjiang (CN); Chensheng Ren, Zhenjiang (CN); Menglei Wei, Zhenjiang (CN); Tengfei Zhang, Zhenjiang (CN); Jiawei Shi, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/912,059

(22) PCT Filed: Jan. 11, 2022

(86) PCT No.: PCT/CN2022/071365
§ 371 (c)(1),
(2) Date: Sep. 16, 2022

(87) PCT Pub. No.: WO2022/227703
PCT Pub. Date: Nov. 3, 2022

(65) Prior Publication Data
US 2024/0016080 A1    Jan. 18, 2024

(30) Foreign Application Priority Data
Apr. 27, 2021    (CN) .......................... 202110460015.6

(51) Int. Cl.
*A01C 11/02*    (2006.01)

(52) U.S. Cl.
CPC .................................. *A01C 11/025* (2013.01)

(58) Field of Classification Search
CPC ....... A01C 11/025; A01C 11/02; A01C 11/00; A01C 11/006
See application file for complete search history.

(56) References Cited

U.S. PATENT DOCUMENTS

| 4,635,215 A | * | 1/1987 | Friend | ...................... | G01V 8/20 |
| | | | | | 250/222.2 |
| 4,947,579 A | * | 8/1990 | Harrison | ................. | A01G 9/086 |
| | | | | | 47/1.01 R |

(Continued)

FOREIGN PATENT DOCUMENTS

| CN | 103340051 A | 10/2013 |
| CN | 103444329 A | 12/2013 |

(Continued)

*Primary Examiner* — Jamie L McGowan
(74) *Attorney, Agent, or Firm* — Bayramoglu Law Offices LLC (57) ABSTRACT

A method for conveying and dropping seedlings based on a device for conveying and positioning a seedling tray of an automatic transplanter, wherein the device for conveying and positioning the seedling tray of the automatic transplanter includes a platform for conveying the seedling tray, a first sensor, a second sensor, a plurality of push rods, and a control system. The platform is configured for conveying the seedling tray to be below seedling picking claws. The push rods are evenly distributed on the platform. The seedling tray is placed between adjacent two of the push rods. The first sensor is mounted close to the seedling picking claws and configured for identifying the seedling tray. The second sensor is mounted on a rack of the platform for conveying the seedling tray and configured for identifying the push rods. The control system controls the platform for conveying the seedling tray.

2 Claims, 5 Drawing Sheets

(56) References Cited

U.S. PATENT DOCUMENTS

| | | | | |
|---|---|---|---|---|
| 5,676,072 A * | 10/1997 | Williames | ............ | A01C 11/025 414/404 |
| 5,680,727 A | 10/1997 | Sakaue et al. | | |
| 5,842,306 A * | 12/1998 | Onosaka | ................ | A01G 9/086 47/1.01 R |
| 5,911,631 A * | 6/1999 | Bouldin | ................ | A01G 9/086 47/1.01 R |
| 6,044,778 A * | 4/2000 | Shokaku | ............ | A01C 11/025 111/105 |
| 6,634,306 B1 * | 10/2003 | Faulring | .............. | A01C 11/025 111/900 |
| 11,259,458 B2 * | 3/2022 | Hu | ....................... | A01C 11/025 |
| 11,350,560 B1 * | 6/2022 | Buell | ...................... | A01C 11/025 |
| 2002/0043195 A1 * | 4/2002 | Williames | ............ | A01C 11/025 111/105 |
| 2010/0170426 A1 * | 7/2010 | Faulring | .............. | A01G 9/0299 111/105 |
| 2011/0179982 A1 * | 7/2011 | Faulring | .............. | A01G 9/0299 111/105 |
| 2020/0068792 A1 * | 3/2020 | Williames | ............ | A01C 11/025 |
| 2020/0120860 A1 * | 4/2020 | Hu | ....................... | A01C 11/025 |
| 2020/0260636 A1 * | 8/2020 | Ito | ........................ | A01C 11/00 |
| 2020/0267911 A1 * | 8/2020 | Liu | ........................ | A01G 9/083 |
| 2020/0375089 A1 * | 12/2020 | Crouse | ................. | A01C 11/025 |
| 2021/0015027 A1 * | 1/2021 | Moiddin | .............. | A01C 11/006 |
| 2021/0329830 A1 * | 10/2021 | Hu | ....................... | A01C 11/025 |
| 2021/0329831 A1 * | 10/2021 | Hu | ....................... | A01C 11/025 |
| 2022/0264791 A1 * | 8/2022 | Arvidsson | ........... | A01B 79/005 |
| 2022/0272892 A1 * | 9/2022 | Rickard | .................. | A01G 7/06 |
| 2022/0279707 A1 * | 9/2022 | Verner | ................ | A01C 11/025 |
| 2023/0247936 A1 * | 8/2023 | Han | ...................... | B25J 15/022 111/100 |
| 2024/0016080 A1 * | 1/2024 | Hu | ....................... | A01C 11/025 |

FOREIGN PATENT DOCUMENTS

| | | |
|---|---|---|
| CN | 105103741 A | 12/2015 |
| CN | 106258124 A | 1/2017 |
| CN | 113079774 A | 7/2021 |
| WO | 2019051991 A1 | 3/2019 |
| WO | 2019148782 A1 | 8/2019 |

\* cited by examiner

| 1st | 5th | 9th  | 9th  | 5th | 1st |
|-----|-----|------|------|-----|-----|
| 2nd | 6th | 10th | 10th | 6th | 2nd |
| 1st | 5th | 9th  | 9th  | 5th | 1st |
| 2nd | 6th | 10th | 10th | 6th | 2nd |
| 1st | 5th | 9th  | 9th  | 5th | 1st |
| 2nd | 6th | 10th | 10th | 6th | 2nd |
| 3rd | 7th | 11th | 11th | 7th | 3rd |
| 4th | 8th | 12th | 12th | 8th | 4th |
| 3rd | 7th | 11th | 11th | 7th | 3rd |
| 4th | 8th | 12th | 12th | 8th | 4th |
| 3rd | 7th | 11th | 11th | 7th | 3rd |
| 4th | 8th | 12th | 12th | 8th | 4th |

METHOD FOR CONVEYING AND DROPPING SEEDLINGS BASED ON DEVICE FOR CONVEYING AND POSITIONING SEEDLING TRAY OF AUTOMATIC TRANSPLANTER

CROSS REFERENCES TO THE RELATED APPLICATIONS

The application is the national phase entry of International Application No. PCT/CN2022/071365, filed on Jan. 11, 2022, which is based on and claims priority on Chinese patent application No. 202110460015.6, filed on Apr. 27, 2021, the entire contents of which are incorporated herein by reference.

TECHNICAL FIELD

The present disclosure belongs to the technical field of transplanters, and in particular relates to a method for conveying and dropping seedlings based on a device for conveying and positioning a seedling tray of an automatic transplanter.

BACKGROUND

In China, the annual planting area of vegetables is kept at more than 23.33 million hectares (350 million mu), and the annual yield of the vegetables is more than 800 million tons. Vegetable production provides a primary income for farmers. In terms of the planting area and yield of the vegetables, China produces and consumes the most vegetables in the world. However, the level of mechanization of the national vegetable industry, especially during planting and harvesting, is still quite low. Vegetable seedling raising and transplanting refer to that vegetable seeds are sowed into a seedbed suitable for seedling growth for raising, and when the outdoor temperature is suitable for the seedling growth, healthy plug seedlings are transplanted to the field for planting. Currently, most transplanters in the market are semi-automatic, and the seedlings need to be manually divided and fed, and then planted by the transplanters. A fully-automatic transplanter is being developed.

The prior art discloses a system and method for controlling conveying and positioning of seedling trays of an automatic transplanter. The system can perform position compensation by a slight increase button and a slight decrease button, thus eliminating positioning errors of the seedling trays. Nevertheless, when the system is in use, manual calibration is still needed, multiple complex buttons are adopted, and the problem that other seedlings in the seedling tray are likely to be dragged out or damaged within a return stroke of horizontally extracted seedlings is not taken into consideration.

The prior art discloses a device and method for automatically extracting and dropping seedlings for a transplanter. The device can extract seedlings in a row without an interval. In spite of that, the device has seedling distribution parts spaced by a larger distance and performs seedling dropping after seedling picking claws are dispersed. As a result, the action and complexity of the seedling picking claws are increased.

The prior art discloses a method and system for extracting seedlings in a row at intervals and dropping the seedlings in turn of a potted seedling transplanter. The seedlings in a column can be all extracted at intervals for two times. However, the device is singly driven by an air cylinder, resulting in poor stability. Furthermore, the device needs six seedling picking claws and a rotary type seedling distribution mechanism, resulting in structural complexity of the transplanter.

SUMMARY

The objective of the present disclosure is to overcome the shortcomings of the prior art by providing a method for conveying and dropping seedlings based on a device for conveying and positioning a seedling tray of an automatic transplanter. The method can improve positioning accuracy, and is adopted to efficiently extract seedlings in a column at intervals without dragging out or damaging other seedlings in a seedling tray, and simplifies a mechanical structure and action, and so on.

The present disclosure achieves the above technical objective through the following technical means.

A device for conveying and positioning a seedling tray of an automatic transplanter includes a platform for conveying the seedling tray, a first sensor, a second sensor, a plurality of push rods, and a control system, where, the platform for conveying the seedling tray is configured for conveying the seedling tray to be below seedling picking claws; the push rods are evenly distributed on the platform for conveying the seedling tray; the seedling tray is placed between adjacent two of the push rods;

the first sensor is mounted close to the seedling picking claws and configured for identifying the seedling tray; the second sensor is mounted on a rack of the platform for conveying the seedling tray and configured for identifying the push rods; and the control system controls, according to the first sensor and the second sensor, the platform for conveying the seedling tray to allow a first row of the seedling tray to be located at a grasping position of a last one of the seedling picking claws encountered in a forward direction of the seedling tray.

Further, the first sensor is located on a left side of the last one of the seedling picking claws encountered in the forward direction of the seedling tray; and the second sensor is located at any position of the rack of the platform for conveying the seedling tray.

Further, a distance between the first sensor and the last one of the seedling picking claws is larger than a distance between the adjacent two of the push rods.

A method for conveying and dropping seedlings based on the device for conveying and positioning the seedling tray of the automatic transplanter includes the following steps:

conveying and positioning the seedling tray, specifically including controlling, by the control system, a motor of the platform for conveying the seedling tray to allow the seedling tray to be conveyed to a position where the first sensor is located, where the control system acquires a first pulse value D1 of the motor; controlling, by the control system, the motor of the platform for conveying the seedling tray to allow the seedling tray to be conveyed continuously, where when the second sensor identifies the push rods, the control system acquires a second pulse value D2 of the motor; setting a last one of the seedling picking claws encountered in a forward direction of the seedling tray as a first seedling picking claw, and determining a distance between a current position of the seedling tray and the first seedling picking claw according to a difference value between D2 and D1;

and controlling, by the control system, the motor of the platform for conveying the seedling tray to allow the seedling tray to be conveyed to the grasping position of the first seedling picking claw;

synchronously extracting the seedlings by the seedling picking claws, specifically including controlling, by the control system, the seedling picking claws to directionally move to be above a first column of the seedling tray; controlling, by the control system, the seedling picking claws to descend, be inserted into the seedling tray, and ascend to extract the seedlings, so as to complete extraction of the seedlings in a column at intervals; and controlling, by the control system, the seedling picking claws to return to an initial position to drop the seedlings;

controlling, by the control system, the platform for conveying the seedling tray to allow the seedling tray to move forwards; and controlling, by the control system, the seedling picking claws to repeatedly operate to extract other seedlings in the first column of the seedling tray in a same way till the seedlings in the first column of the seedling tray are all extracted;

controlling, by the control system, the platform for conveying the seedling tray to allow the seedling tray to move backwards to the grasping position of the first seedling picking claw; controlling, by the control system, the seedling picking claws to directionally move to be above a second column of the seedling tray; controlling, by the control system, the seedling picking claws to descend, be inserted into the seedling tray, and ascend to extract the seedlings, so as to complete extraction of the seedlings in a column at intervals; and controlling, by the control system, the seedling picking claws to return to the initial position to drop the seedlings;

controlling, by the control system, the platform for conveying the seedling tray to allow the seedling tray to move forwards; and controlling, by the control system, the seedling picking claws to repeatedly operate to extract other seedlings in the second column of the seedling tray in the same way till the seedlings in the second column of the seedling tray are all extracted;

and so on till the seedlings in the seedling tray are all extracted.

Further, the seedling tray is a seedling tray of 12*6 with six columns and 12 cells per column, and three seedling picking claws are provided on at least one side of the platform for conveying the seedling tray. The seedling picking claws encountered in the forward direction of the seedling tray are respectively set as a third seedling picking claw, a second seedling picking claw, and a first seedling picking claw, and the three seedling picking claws are configured for synchronously extracting the seedlings, and specifically including the following steps:

S01: controlling, by the control system, the three seedling picking claws on the one side of the platform for conveying the seedling tray to directionally move to be above the first column of the seedling tray; controlling, by the control system, the third seedling picking claw to grasp a seedling in a cell in the first column and a fifth row of the seedling tray, the second seedling picking claw to grasp a seedling in a cell in the first column and a third row of the seedling tray, and the first seedling picking claw to grasp a seedling in a cell in the first column and a first row of the seedling tray; and controlling, by the control system, the third seedling picking claw, the second seedling picking claw, and the first seedling picking claw to return to the initial position to drop the seedlings;

S02: controlling, by the control system, the platform for conveying the seedling tray to allow the seedling tray to move forwards by a distance of one row; and controlling, by the control system, the third seedling picking claw to grasp a seedling in a cell in the first column and a sixth row of the seedling tray, the second seedling picking claw to grasp a seedling in a cell in the first column and a fourth row of the seedling tray, and the first seedling picking claw to grasp a seedling in a cell in the first column and a second row of the seedling tray;

S03: controlling, by the control system, the platform for conveying the seedling tray to allow the seedling tray to move forwards by a distance of five rows; and controlling, by the control system, the third seedling picking claw to grasp a seedling in a cell in the first column and an eleventh row of the seedling tray, the second seedling picking claw to grasp a seedling in a cell in the first column and a ninth row of the seedling tray, and the first seedling picking claw to grasp a seedling in a cell in the first column and a seventh row of the seedling tray;

S04: controlling, by the control system, the platform for conveying the seedling tray to allow the seedling tray to move forwards by the distance of one row; and controlling, by the control system, the third seedling picking claw to grasp a seedling in a cell in the first column and a twelfth row of the seedling tray, the second seedling picking claw to grasp a seedling in a cell in the first column and a tenth row of the seedling tray, and the first seedling picking claw to grasp a seedling in a cell in the first column and an eighth row of the seedling tray; and S05: controlling, by the control system, the platform for conveying the seedling tray to allow the seedling tray to move backwards to the grasping position of the first seedling picking claw; controlling, by the control system, the three seedling picking claws to directionally move to be above other columns of the seedling tray; and repeating S01-S03 till the seedlings in the seedling tray with the six columns are all extracted.

The method for conveying and dropping seedlings based on the device for conveying and positioning the seedling tray of the automatic transplanter has the following beneficial effects.

1. Opposite-type photoelectric sensors are adopted to position the seedling tray and achieve higher stability and accuracy compared with a contact type proximity switch and the like; and by dual positioning performed by the sensor for identifying the seedling tray and the sensor for identifying the push rods, the higher accuracy and wide applicability are achieved.

2. Through a special method for controlling the seedling tray to move forwards or backwards to extract the seedlings in a column at intervals, original seedlings in the seedling tray are effectively prevented from being affected in the process of extracting the seedlings back and forth, and the seedlings in the seedling tray are prevented from being dragged out and damaged during movement of the seedling picking claws, so that intactness of the seedlings in the seedling tray is guaranteed, and an accuracy rate of the extraction of the seedlings and a planting rate of the whole transplanter are guaranteed.

3. Through a special method for controlling extraction and dropping of the seedlings, the seedlings are extracted and dropped by linear to-and-fro movement at fixed points and fixed positions without other unnecessary movement, so that the time is saved, and the efficiency of extracting, dropping, and feeding the seedlings is improved. Thus, the planting rate of the whole transplanter is guaranteed.

REFERENCE NUMERALS 1. seedling picking claw, 2. platform for conveying a seedling tray, 3. first sensor, 4. second sensor, 5. push rod, and 6. seedling guiding tube.

DETAILED DESCRIPTION OF THE EMBODIMENTS

The present disclosure will be further described below in conjunction with the accompanying drawings and specific embodiments, but the protection scope of the present disclosure is not limited thereto.

The embodiments of the present disclosure are described below in detail. Examples of the embodiments are shown in the drawings. The same or similar numerals represent the same or similar elements or elements having the same or similar functions throughout the specification. The embodiments described below with reference to the drawings are illustrative, which are merely intended to explain the present disclosure, rather than to limit the present disclosure.

It should be understood that, in the description of the present disclosure, the terms such as "central", "longitudinal", "transverse", "long", "wide", "thick", "upper", "lower", "axial", "radial", "vertical", "horizontal", "inner", and "outer" are intended to indicate orientations or positional relations shown in the drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure. Moreover, the terms such as "first" and "second" are used only for the purpose of description and should not be construed as indicating or implying a relative importance, or implicitly indicating a quantity of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified and limited, the terms "installed", "connected with", "connected to", and "fixed" should be understood in a board sense. For example, the connection may be a fixed connection, a detachable connection or an integrated connection, may be a mechanical connection or an electrical connection, may be a direct connection or an indirect connection with use of an intermediate medium, or may be intercommunication between two components. Those of ordinary skill in the art may understand specific meanings of the above terms in the present disclosure based on a specific situation.

Figure 4:
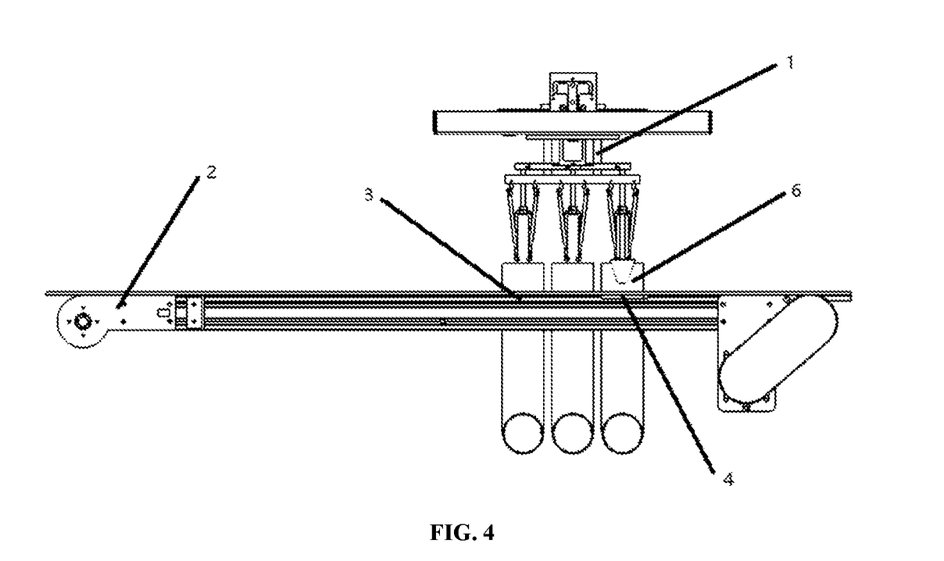
FIG. 4 shows a structural diagram of the device for conveying and positioning the seedling tray of the automatic transplanter of the present disclosure.
Figure 5:
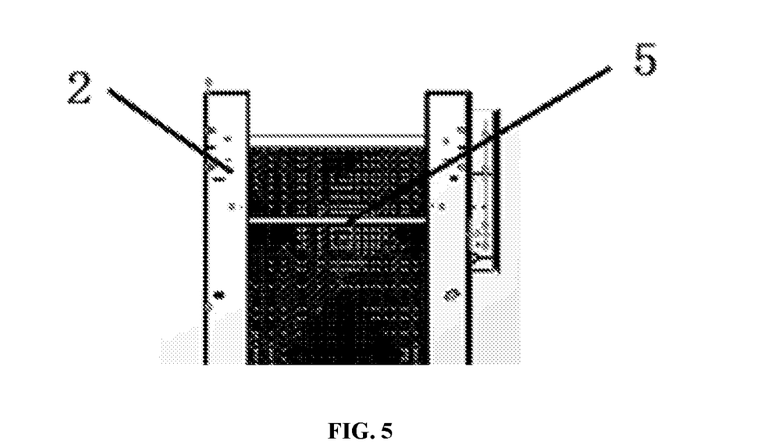
FIG. 5 shows a structural detail drawing of a push rod and a platform for conveying the seedling tray of the present disclosure.

As shown in FIG. 4 and FIG. 5, a device for conveying and positioning a seedling tray of an automatic transplanter includes a platform 2 for conveying the seedling tray, a first sensor 3, a second sensor 4, a plurality of push rods 5, and a control system, where the platform 2 for conveying the seedling tray is configured for conveying the seedling tray to be below seedling picking claws 1; the seedling picking claws 1 are located on two sides of the platform 2 for conveying the seedling tray; and seedling guiding tubes 6 are located below the seedling picking claws 1. The push rods 5 are evenly distributed on a chain of the platform 2 for conveying the seedling tray; the seedling tray is placed between adjacent two of the push rods 5; and a motor drives and controls the chain to allow the seedling tray to move forwards or backwards. Generally, the adjacent two of the push rods are spaced with about four cells of the seedling tray. The first sensor 3 is mounted close to the seedling picking claws 1 and configured for identifying the seedling tray. The second sensor 4 is mounted on a rack of the platform 2 for conveying the seedling tray and configured for identifying the push rods 5, and the control system controls, according to the first sensor 3 and the second sensor 4, the platform 2 for conveying the seedling tray to allow a first row of the seedling tray to be located at a grasping position of a last one of the seedling picking claws encountered in a forward direction of the seedling tray. The first sensor 3 is located on a left side of the last one of the seedling picking claws encountered in the forward direction of the seedling tray, the second sensor 4 is located at any position of the rack of the platform 2 for conveying the seedling tray, and a distance between the first sensor 3 and the last one of the seedling picking claws is larger than a distance between the adjacent two of the push rods.

A method for conveying and dropping seedlings based on the device for conveying and positioning the seedling tray of the automatic transplanter includes the following steps.

Figure 1:
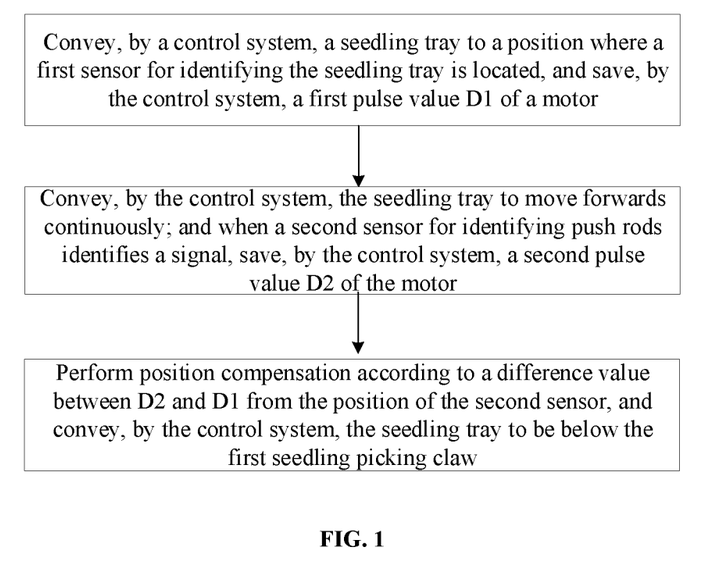
FIG. 1 shows a flow chart of performing conveying and positioning of a seedling tray by a device for conveying and positioning a seedling tray of an automatic transplanter of the present disclosure.

As shown in FIG. 1, conveying and positioning the seedling tray specifically includes the following steps.

The control system controls the motor of the platform 2 for conveying the seedling tray to allow the seedling tray to be conveyed to a position where the first sensor 3 is located, where the control system acquires a first pulse value D1 of the motor; the control system controls the motor of the platform 2 for conveying the seedling tray to allow the seedling tray to be conveyed continuously, where when the second sensor 4 identifies the push rods, the control system acquires a second pulse value D2 of the motor; sets the last one of the seedling picking claws encountered in the forward direction of the seedling tray as a first seedling picking claw, and determines a distance between a current position of the seedling tray and the first seedling picking claw according to a difference value between D2 and D1; and the control system controls the motor of the platform 2 for conveying the seedling tray to allow the seedling tray to be conveyed to the grasping position of the first seedling picking claw.

Figure 2:
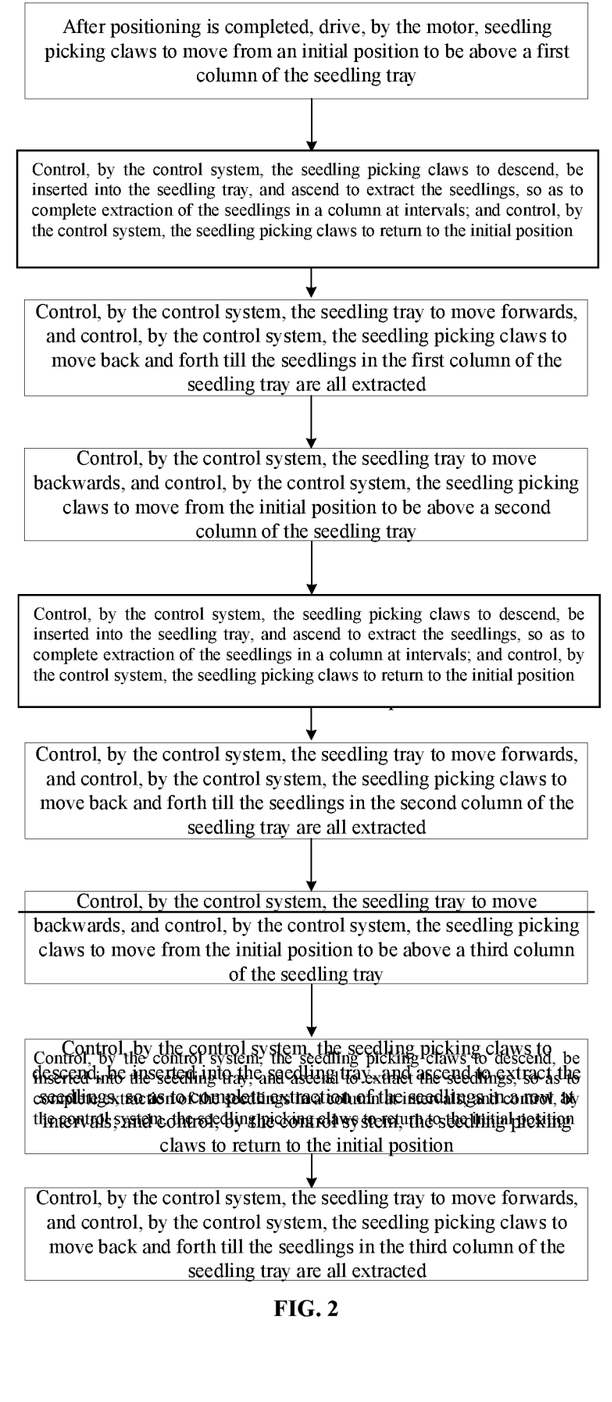
FIG. 2 shows a flow chart of a method for dropping seedlings based on the device for conveying and positioning the seedling tray of the automatic transplanter of the present disclosure.

As shown in FIG. 2, synchronously extracting the seedlings by the seedling picking claws 1 specifically includes the following steps.

The control system controls the seedling picking claws 1 to directionally move to be above a first column of the seedling tray; controls the seedling picking claws 1 to descend, be inserted into the seedling tray, and ascend to extract the seedlings, so as to complete extraction of the seedlings in a column at intervals; and controls the seedling picking claws 1 to return to an initial position for seedling dropping.

The control system controls the platform 2 for conveying the seedling tray to allow the seedling tray to move forwards; and controls the seedling picking claws 1 to repeatedly operate to extract other seedlings in the first column of the seedling tray in the same way till the seedlings in the first column of the seedling tray are all extracted.

The control system controls the platform 2 for conveying the seedling tray to allow the seedling tray to move backwards to the grasping position of the first seedling picking claw; controls the seedling picking claws 1 to directionally move to be above a second column of the seedling tray; controls the seedling picking claws 1 to descend, be inserted into the seedling tray, and ascend to extract the seedlings, so as to complete extraction of the seedlings in a column at intervals; and controls the seedling picking claws 1 to return to the initial position for the seedling dropping.

The control system controls the platform 2 for conveying the seedling tray to allow the seedling tray to move forwards, and controls the seedling picking claws 1 to repeatedly operate to extract other seedlings in the second column of the seedling tray in the same way till the seedlings in the second column of the seedling tray are all extracted.

The above actions are repeated till the seedlings in the whole seedling tray are all extracted.

Embodiment 1

Figure 3A:
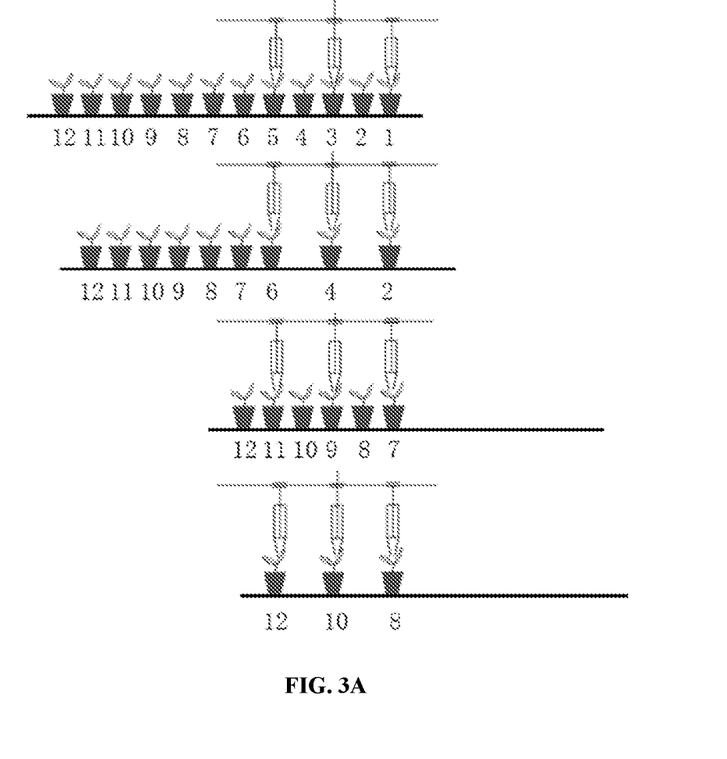
FIG. 3A and FIG. 3B show schematic diagrams of a method for conveying and dropping seedlings based on the device for conveying and positioning the seedling tray of the automatic transplanter of the present disclosure.
Figure 3B:
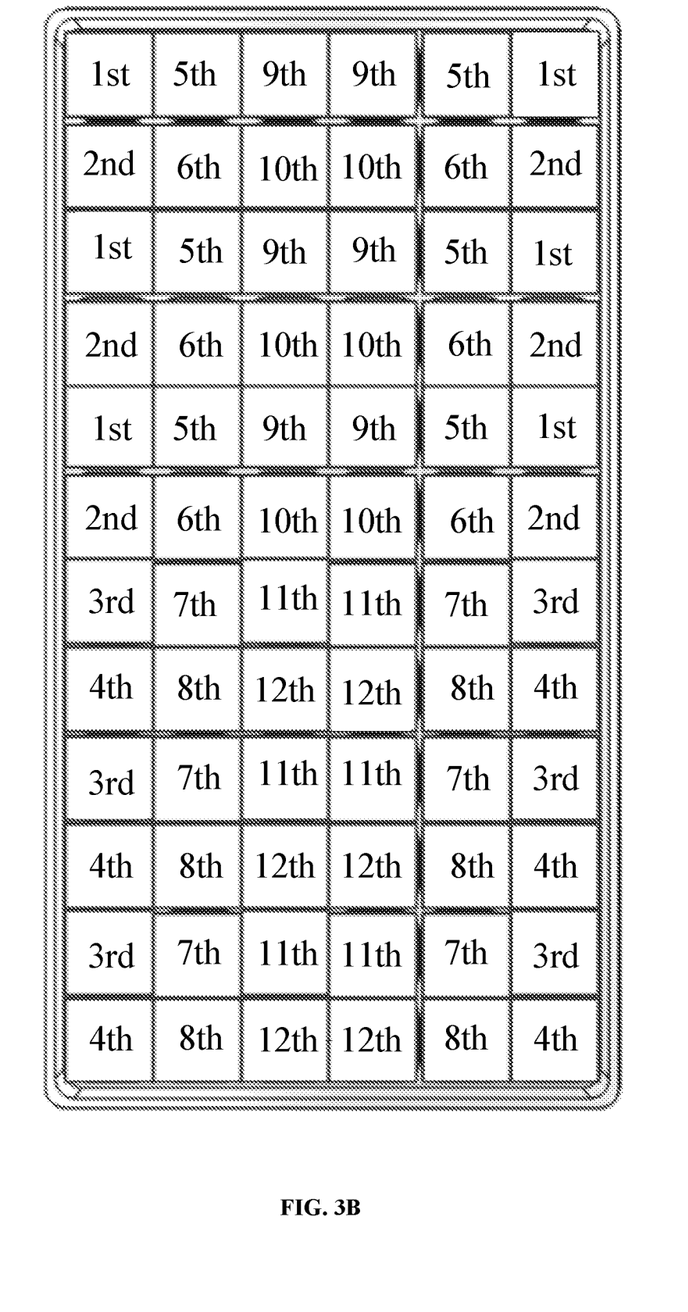

As shown in FIG. 3A and FIG. 3B, a seedling tray of 12*6 has six columns with 12 cells per column, and three seedling picking claws 1 are provided on each side of the platform 2 for conveying the seedling tray. The three seedling picking claws on one side of the platform 2 for conveying the seedling tray are exemplified below. The seedling picking claws encountered in a forward direction of the seedling tray are respectively set as a third seedling picking claw, a second seedling picking claw, and a first seedling picking claw, and the three seedling picking claws are configured for synchronously extracting seedlings. Serial numbers in FIG. 3A represent the number of 12 cells in one column of the seedling tray. Serial numbers in FIG. 3B represent ordinal numbers of synchronous grasping times. Specifically:

S01: The control system controls the three seedling picking claws on the one side of the platform 2 for conveying the seedling tray to directionally move to be above a first column of the seedling tray. For the first time, the control system controls the third seedling picking claw to grasp a seedling in a cell in the first column and the fifth row of the seedling tray, the second seedling picking claw to grasp a seedling in a cell in the first column and the third row of the seedling tray, and the first seedling picking claw to grasp a seedling in a cell in the first column and the first row of the seedling tray, and the control system controls the third seedling picking claw, the second seedling picking claw, and the first seedling picking claw to synchronously return to the initial position for seedling dropping. The three seedling picking claws on the other side grasp seedlings at corresponding positions in the sixth column of the seedling tray in the same way.

S02: The control system controls the platform 2 for conveying the seedling tray to allow the seedling tray to move forwards by a distance of one row. For the second time, the control system controls the third seedling picking claw to grasp a seedling in a cell in the first column and the sixth row of the seedling tray, the second seedling picking claw to grasp a seedling in a cell in the first column and the fourth row of the seedling tray, and the first seedling picking claw to grasp a seedling in a cell in the first column and the second row of the seedling tray.

S03: The control system controls the platform 2 for conveying the seedling tray to allow the seedling tray to move forwards by a distance of five rows. For the third time, the control system controls the third seedling picking claw to grasp a seedling in a cell in the first column and the eleventh row of the seedling tray, the second seedling picking claw to grasp a seedling in a cell in the first column and the ninth row of the seedling tray, and the first seedling picking claw to grasp a seedling in a cell in the first column and the seventh row of the seedling tray.

S04: The control system controls the platform 2 for conveying the seedling tray to allow the seedling tray to move forwards by the distance of one row. For the fourth time, the control system controls the third seedling picking claw to grasp a seedling in a cell in the first column and the twelfth row of the seedling tray, the second seedling picking claw to grasp a seedling in a cell in the first column and the tenth row of the seedling tray, and the first seedling picking claw to grasp a seedling in a cell in the first column and the eighth row of the seedling tray. At this time, the seedlings in the first column of the seedling tray are all extracted by the seedling picking claws on the one side, and the seedlings in the sixth column of the seedling tray are all extracted by the seedling picking claws on the other side.

S05: The control system controls the platform 2 for conveying the seedling tray to allow the seedling tray to move backwards to the grasping position of the first seedling picking claw, and controls the three seedling picking claws 1 on the one side to directionally move to be above a second column of the seedling tray. For the fifth time, the control system controls the third seedling picking claw to grasp a seedling in a cell in the second column and the fifth row of the seedling tray, the second seedling picking claw to grasp a seedling in a cell in the second column and the third row of the seedling tray, and the first seedling picking claw to grasp a seedling in a cell in the second column and the first row of the seedling tray, and the control system controls the third seedling picking claw, the second seedling picking claw, and the first seedling picking claw to synchronously return to the initial position for the seedling dropping.

S06: The control system controls the platform 2 for conveying the seedling tray to allow the seedling tray to move forwards by the distance of one row. For the sixth time, the control system controls the third seedling picking claw to grasp a seedling in a cell in the second column and the sixth row of the seedling tray, the second seedling picking claw to grasp a seedling in a cell in the second column and the fourth row of the seedling tray, and the first seedling picking claw to grasp a seedling in a cell in the second column and the second row of the seedling tray.

S07: The control system controls the platform 2 for conveying the seedling tray to allow the seedling tray to move forwards by the distance of five rows. For the seventh time, the control system controls the third seedling picking claw to grasp a seedling in a cell in the second column and the eleventh row of the seedling tray, the second seedling picking claw to grasp a seedling in a cell in the second column and the ninth row of the seedling tray, and the first seedling picking claw to grasp a seedling in a cell in the second column and the seventh row of the seedling tray.

S08: The control system controls the platform 2 for conveying the seedling tray to allow the seedling tray to move forwards by the distance of one row. For the eighth time, the control system controls the third seedling picking claw to grasp a seedling in a cell in the second column and the twelfth row of the seedling tray, the second seedling picking claw to grasp a seedling in a cell in the second column and the tenth row of the seedling tray, and the first seedling picking claw to grasp a seedling in a cell in the second column and the eighth row of the seedling tray. At this time, the seedlings in the second column of the seedling tray are all extracted by the seedling picking claws on the one side, and the seedlings in the fifth column of the seedling tray are all extracted by the seedling picking claws on the other side.

S09: The control system controls the platform 2 for conveying the seedling tray to allow the seedling tray to move backwards to the grasping position of the first seedling picking claw, and controls the three seedling picking claws 1 on the one side to directionally move to be above the third column of the seedling tray. For the ninth time, the control system controls the third seedling picking claw to grasp a seedling in a cell in the third column and the fifth row of the seedling tray, the second seedling picking claw to grasp a seedling in a cell in the third column and the third row of the seedling tray, and the first seedling picking claw to grasp a seedling in a cell in the third column and the first row of the seedling tray, and the control system controls the third seedling picking claw, the second seedling picking claw, and the first seedling picking claw to synchronously return to the initial position for the seedling dropping.

S10: The control system controls the platform 2 for conveying the seedling tray to allow the seedling tray to move forwards by the distance of one row. For the tenth time, the control system controls the third seedling picking claw to grasp a seedling in a cell in the third column and the sixth row of the seedling tray, the second seedling picking claw to grasp a seedling in a cell in the third column and the fourth row of the seedling tray, and the first seedling picking claw to grasp a seedling in a cell in the third column and the second row of the seedling tray.

S11: The control system controls the platform 2 for conveying the seedling tray to allow the seedling tray to move forwards by the distance of five rows. For the eleventh time, the control system controls the third seedling picking claw to grasp a seedling in a cell in the third column and the eleventh row of the seedling tray, the second seedling picking claw to grasp a seedling in a cell in the third column and the ninth row of the seedling tray, and the first seedling picking claw to grasp a seedling in a cell in the third column and the seventh row of the seedling tray.

S12: The control system controls the platform 2 for conveying the seedling tray to allow the seedling tray to move forwards by the distance of one row. For the twelfth time, the control system controls the third seedling picking claw to grasp a seedling in a cell in the third column and the twelfth row of the seedling tray, the second seedling picking claw to grasp a seedling in a cell in the third column and the tenth row of the seedling tray, and the first seedling picking claw to grasp a seedling in a cell in the third column and the eighth row of the seedling tray. At this time, the seedlings in the third column of the seedling tray are all extracted by the seedling picking claws on the one side, and the seedlings in the fourth column of the seedling tray are all extracted by the seedling picking claws on the other side.

At the moment, the seedlings in the whole seedling tray are all extracted through twelve times. Then, a new seedling tray is quickly fed, and the above actions are repeated.

The present disclosure provides a novel method for a fully-automatic transplanter to extract and drop seedlings and control a seedling tray to move forwards or backwards. On the basis of an original system, a photoelectric sensor is adopted, so that more reliability is achieved, and dual sensors are adopted for positioning, so that the accuracy in positioning of the seedling tray moving forwards is improved. The seedlings in the first column of the seedling tray are all extracted through the method of the present disclosure, the seedling tray is re-fed by moving forwards or backwards through the device for controlling the seedling tray to move forwards or backwards, and then the seedling picking claws are positioned to extract the seedlings in the second column. This way can effectively solve the problem that original seedlings in the seedling tray are sandwiched or dragged out when the seedlings are horizontally extracted.

It should be understood that although this specification is described in accordance with the embodiments, not every embodiment only includes one independent technical solution. This description of the specification is for the sake of clarity only. Those skilled in the art should take the specification as a whole, and the technical solutions in the embodiments can also be appropriately combined to form other implementations that can be understood by those skilled in the art.

The series of detailed description listed above are only specific illustration of feasible embodiments of the present disclosure, rather than limiting the protection scope of the present disclosure. All equivalent embodiments or changes made without departing from the technical spirit of the present disclosure should fall within the protection scope of the present disclosure.

What is claimed is:

1. A method for conveying and dropping seedlings based on a device for conveying and positioning a seedling tray of an automatic transplanter, wherein the device for conveying and positioning the seedling tray of the automatic transplanter comprises a platform for conveying the seedling tray, a first sensor, a second sensor, a plurality of push rods, and a control system, wherein the platform for conveying the seedling tray is configured for conveying the seedling tray to be below seedling picking claws; the push rods are evenly distributed on the platform for conveying the seedling tray; the seedling tray is placed between adjacent two of the push rods; the first sensor is mounted close to the seedling picking claws and is configured for identifying the seedling tray; the second sensor is mounted on a rack of the platform for conveying the seedling tray and is configured for identifying the push rods; the control system controls, according to the first sensor and the second sensor, the platform for conveying the seedling tray to allow a first row of the seedling tray to be located at grasping positions of the seedling picking claws; the first sensor is located on a left side of a last one of the seedling picking claws encountered in a forward direction of the seedling tray; the second sensor is located at any position of the rack of the platform for conveying the seedling tray; and a distance between the first sensor and the last one of the seedling picking claws is larger than a distance between the adjacent two of the push rods, and the method comprises the following steps:

conveying and positioning the seedling tray, further comprising:

controlling, by the control system, a motor of the platform for conveying the seedling tray to allow the seedling tray to be conveyed to a position where the first sensor is located, wherein the control system acquires a first pulse value D1 of the motor; controlling, by the control system, the motor of the platform for conveying the seedling tray to allow the seedling tray to be conveyed continuously, wherein when the second sensor identifies the push rods, the control system acquires a second pulse value D2 of the motor; setting the last one of the seedling picking claws encountered in the forward direction of the seedling tray as a first seedling picking claw, and determining a distance between a current position of the seedling tray and the first seedling picking claw according to a difference value between D2 and D1; and controlling, by the control system, the motor of the platform for conveying the seedling tray to allow the seedling tray to be conveyed to a grasping position of the first seedling picking claw;

synchronously extracting the seedlings by the seedling picking claws, further comprising:

controlling, by the control system, the seedling picking claws to directionally move to be above a first column of the seedling tray; controlling, by the control system, the seedling picking claws to descend, be inserted into the seedling tray, and ascend to extract the seedlings, so as to complete an extraction of the seedlings in a column at intervals; and controlling, by the control system, the seedling picking claws to return to an initial position to drop the seedlings;

controlling, by the control system, the platform for conveying the seedling tray to allow the seedling tray to move forwards; and controlling, by the control system, the seedling picking claws to repeatedly operate to extract other seedlings in the first column of the seedling tray in a same way till the seedlings in the first column of the seedling tray are all extracted;

controlling, by the control system, the platform for conveying the seedling tray to allow the seedling tray to move backwards to the grasping position of the first seedling picking claw; controlling, by the control system, the seedling picking claws to directionally move to be above a second column of the seedling tray; controlling, by the control system, the seedling picking claws to descend, be inserted into the seedling tray, and ascend to extract the seedlings, so as to complete the extraction of the seedlings in a column at intervals; and controlling, by the control system, the seedling picking claws to return to the initial position to drop the seedlings;

controlling, by the control system, the platform for conveying the seedling tray to allow the seedling tray to move forwards; and controlling, by the control system, the seedling picking claws to repeatedly operate to extract other seedlings in the second column of the seedling tray in the same way till the seedlings in the second column of the seedling tray are all extracted; and     repeating the above steps until the seedlings in the seedling tray are all extracted.

2. The method for conveying and dropping the seedlings based on the device for conveying and positioning the seedling tray of the automatic transplanter according to claim 1, wherein the seedling tray is a seedling tray of 12*6 with six columns and 12 cells per column; three seedling picking claws are provided on at least one side of the platform for conveying the seedling tray; the seedling picking claws encountered in the forward direction of the seedling tray are respectively set as a third seedling picking claw, a second seedling picking claw, and the first seedling picking claw, and the three seedling picking claws are configured for synchronously extracting the seedlings according to the following steps:

S01: controlling, by the control system, the three seedling picking claws on the one side of the platform for conveying the seedling tray to directionally move to be above the first column of the seedling tray; controlling, by the control system, the third seedling picking claw to grasp a seedling in a cell in the first column and a fifth row of the seedling tray, the second seedling picking claw to grasp a seedling in a cell in the first column and a third row of the seedling tray, and the first seedling picking claw to grasp a seedling in a cell in the first column and a first row of the seedling tray; and controlling, by the control system, the third seedling picking claw, the second seedling picking claw, and the first seedling picking claw to return to the initial position to drop the seedlings;

S02: controlling, by the control system, the platform for conveying the seedling tray to allow the seedling tray to move forwards by a distance of one row; and controlling, by the control system, the third seedling picking claw to grasp a seedling in a cell in the first column and a sixth row of the seedling tray, the second seedling picking claw to grasp a seedling in a cell in the first column and a fourth row of the seedling tray, and the first seedling picking claw to grasp a seedling in a cell in the first column and a second row of the seedling tray;

S03: controlling, by the control system, the platform for conveying the seedling tray to allow the seedling tray to move forwards by a distance of five rows; and controlling, by the control system, the third seedling picking claw to grasp a seedling in a cell in the first column and an eleventh row of the seedling tray, the second seedling picking claw to grasp a seedling in a cell in the first column and a ninth row of the seedling tray, and the first seedling picking claw to grasp a seedling in a cell in the first column and a seventh row of the seedling tray;

S04: controlling, by the control system, the platform for conveying the seedling tray to allow the seedling tray to move forwards by the distance of one row; and controlling, by the control system, the third seedling picking claw to grasp a seedling in a cell in the first column and a twelfth row of the seedling tray, the second seedling picking claw to grasp a seedling in a cell in the first column and a tenth row of the seedling tray, and the first seedling picking claw to grasp a seedling in a cell in the first column and an eighth row of the seedling tray; and S05: controlling, by the control system, the platform for conveying the seedling tray to allow the seedling tray to move backwards to the grasping position of the first seedling picking claw; controlling, by the control system, the three seedling picking claws to directionally move to be above other columns of the seedling tray; and repeating S01-S03 until the seedlings in all six columns of the seedling tray are extracted.

* * * * *